Oct. 4, 1966  F. W. HARTLEY  3,277,288
AUTOMATIC CONTROL MECHANISM FOR MACHINE TOOLS
Filed Feb. 19, 1962 i# United States Patent Office 3,277,288
Patented Oct. 4, 1966

3,277,288
AUTOMATIC CONTROL MECHANISM FOR
MACHINE TOOLS
Frederick Walter Hartley, Hayes, England, assignor to
Electric & Musical Industries Limited, Hayes, England,
a company of Great Britain
Filed Feb. 19, 1962, Ser. No. 173,935
Claims priority, application Great Britain, Mar. 2, 1961,
7,567/61
7 Claims. (Cl. 235—151.11)

This invention relates to the automatic control mechanism for machine tools.

In U.S. patent specification Serial No. 2,928,604 various devices are described and claimed for producing quadratic interpolation. These devices are especially intended for control mechanisms for automatic machines and derive a variable output signal from sets of discrete reference points. The reference points are provided as sets of analogue signals representing discrete values of the variable being interpolated. The output signal is derived by so-called parabolic interpolation, that is by constructing parabolas defined by consecutive groups of three reference points. If, due to errors in programming or in reading the programme, one or more of the reference points is displaced from the curve which is required to be cut, the wrong path will be followed by the cutter and the workpiece may be spoiled. It has hitherto been proposed to detect such errors when they have been made and to stop the machine immediately. As the error has already been made, however, the workpiece may have to be discarded, which is particularly disadvantageous if the error occurs near the end of a complicated profile.

The object of the present invention is to provide a safety device which is capable of stopping the machine before errors occur.

According to the present invention there is provided automatic control mechanism for machine tools comprising means for deriving one or more command signals adapted to determine the point of application of the cutter to the workpiece, means for deriving a monitoring signal responsive to the difference between the directions of the normals to the path to be cut by the machine tool cutter at two points along said path, one of said points at least being ahead of the point of application determined by said command signals, and means for producing an action signal when said monitoring signal exceeds a predetermined limit.

Preferably, means are also provided for overriding said means for stopping the machine, when a change in direction greater than the predetermined limit is required.

Figure 1:
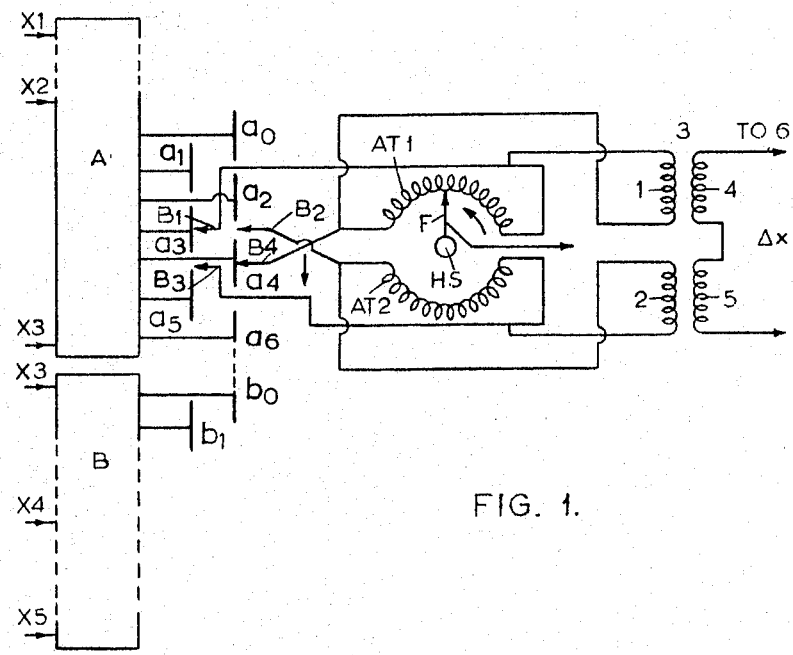
Figure 2:
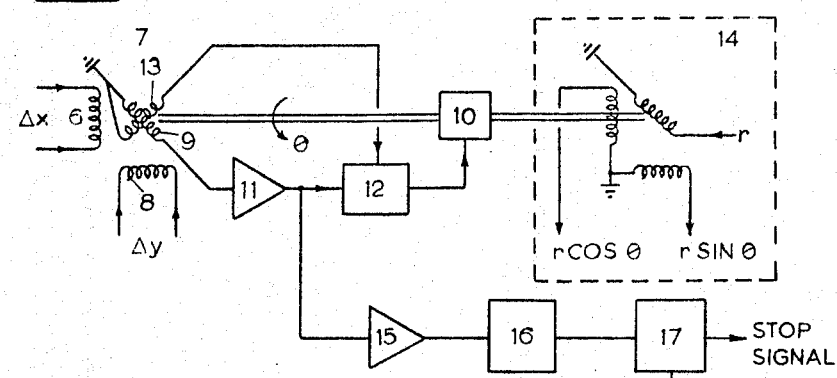
Figure 2:
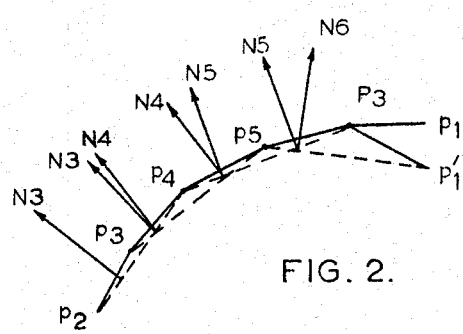

In order that the present invention may be clearly understood and readily carried into effect, the invention will be described with reference to the accompanying drawings in which:

FIGURE 1 illustrates in diagrammatical form a control mechanism of a machine tool according to one example of the present invention, omitting some parts which are duplicates of parts which are illustrated, and FIGURE 2 is a geometrical figure illustrating the operation of the mechanism illustrated in FIGURE 1.

Referring to FIGURE 1, references A and B indicate two parabolic interpolators which may be of the type described in U.S. patent specification Serial No. 2,928,604. Co-phasal alternating voltages having amplitudes proportional to co-ordinates $X_1$, $X_2$ and $X_3$ of three successive points are applied to three input terminals of interpolator A, which produces at its ouput contacts $a_0$, $a_1$, $a_2$, etc., voltages proportional to co-ordinates of more closely spaced points on a parabola through points $X_1$, $X_2$ and $X_3$. There would, of course, be in a practical case, many more studs than shown. Similarly, interpolator B produces at its output contacts $b_0$, $b_1$, $b_2$, etc., voltages proportional to co-ordinates of closely spaced points on a parabola through the reference points $X_3$, $X_4$ and $X_5$. Although contacts $a_6$ and $b_0$ are shown separate for convenience, they are close together and each half the width of the other contacts, or alternatively the contact $a_6$ or contact $b_0$ may be omitted, in which the other contact is of normal width, the last point on the parabola through $X_1$, $X_2$ and $X_3$ thus being the same as the first point on the parabola through $X_3$, $X_4$ and $X_5$. The output voltages vary in discrete steps, and to reduce the size of the steps, sub-interpolation between discrete voltages is performed by a linear interpolator such as is shown in FIGURE 9 of the above mentioned specification. The linear sub-interpolation comprises two auto-transformers $AT_1$ and $AT_2$ traversed in the direction indicated by a brush F on a shaft HS. A second shaft, not shown, carries four brushes $B_1$, $B_2$, $B_3$ and $B_4$, the brushes $B_1$ and $B_3$ traversing the odd numbered contacts $a_1$, $a_3$, etc., of the parabolic interpolators and the brushes $B_2$ and $B_4$ traversing the even numbered contacts, the contacts being staggered in two banks as shown. The direction of traverse of the brushes B relative to the contacts is indicated. The brush F is arranged to make one half revolution whilst the four brushes $B_1$, $B_2$, $B_3$ and $B_4$, travel the distance between the centres of alternate contacts. The brushes are so arranged that the changeover from one contact to the next is virtually instantaneous due to the high speed at which the brushes operate, i.e., the break between $B_4$ leaving contact $a_3$ and making with $a_5$ is negligible. There is thus always a voltage across both the auto-transformers $AT_1$ and $AT_2$ even though only one is being used for sub-interpolation at any one time. With the brushes in the positions shown, voltages from contacts $a_3$ and $a_4$ are applied to the auto-transformers $AT_1$ and brush F interpolates linearly between these two voltages as it traverses $AT_1$. At the same time, the brush $B_2$ is on the point of changing instantaneously from $a_2$ to $a_4$ and the brush $B_3$ is on the point of changing from $a_3$ to $a_5$. Therefore the voltages at contacts $a_4$ and $a_5$ is on the point of becoming applied to auto-transformer $AT_2$ which is eventually traversed by the brush F when it completes its traverse of $AT_1$, the voltages at the contacts $a_2$ and $a_3$ having been just removed from $AT_2$. In this way, while one auto-transformer is in use in bridging two adjacent contacts, the other is leap-frogging from the pair of contacts which has just been traversed, over the pair now being traversed onto the pair about to be traversed, and a virtually continuously varying voltage for controlling the movement of the machine table along one axis is derived from the brush F. Identical apparatus is required for each other axis along which movement is to be controlled, so that, assuming a two co-ordinate control, the output voltages at the brush F and the corresponding brush of the apparatus for the other axis comprise command signals which determine the X and Y co-ordinates of the point of application of the cutter to the workpiece. The shafts of the two interpolating apparatus are driven synchronously and these angular displacements represent a common parameter of interpolation. The circuit as so far described is substantially identical to that shown in U.S. patent specification Serial No. 2,928,604, one difference being that autotransformers $AT_1$ and $AT_2$ are always energised.

In the form of the present invention illustrated in FIGURE 1, the voltages applied to autotransformers $AT_1$ and $AT_2$ are also applied to the primary windings 1 and 2 of a transformer 3 whose secondary windings 4 and 5 are connected in series. Thus there is set up across the secondary windings in series a voltage proportional to the change between alternate co-ordinates. With the brushes in the position shown the voltage across 4 and 5 in series is just changing from that between contacts $a_2$ and $a_4$ to that between contacts $a_3$ and $a_5$. This voltage is denoated by $\Delta x$ and is applied to the stator winding 6 of a resolver 7. To the other stator 8, in space quadrature relation to 6, is applied $\Delta y$, the corresponding change in the y co-ordinate values, and derived from the y co-ordinate interpolators in a similar way. The resolver also has a rotor winding 9 geared to the shaft of a servo motor 10. The input signal for the servo motor is derived from an amplifier 11 which amplifies the voltage set up across the rotor winding 9. This voltage is equal to $\Delta x \cos \theta - \Delta y \sin \theta$ where $\theta$ is the angular displacement of the rotor winding 9 from the position of maximum coupling with 6. In order to make this signal independent of the magnitudes of the applied signals, an additional gain controlled stage 12, whose gain is controlled by the signal from a second rotor winding 13 in space quadrature with winding 9, is inserted between amplifier 11 and motor 10, as described in U.S. patent specification Serial No. 2,900,590. The servo motor rotates the rotor windings to tend to reduce the voltage from winding 9 to zero, and when this condition prevails, $\theta$ is equal to the direction of the normal to surface of the workpiece. This method of setting up the direction of the normal is similar to that shown in U.S. patent specification Serial No. 2,917,693 and U.S. patent specification Serial No. 2,900,590, and in these specifications the position of the servo motor shaft is used to resolve a dimension of the cutter into the two components required to provide compensation for the cutter size. Such an arrangement is indicated at 14, the cutter dimension being denoted by $r$, and its components by $r \cos \theta$ and $r \sin \theta$, the respective signals being added to the outputs derived from F and the corresponding brush of the Y interpolating apparatus. The output of amplifier 11 is further amplified at 15 and applied to a phase sensitive detector 16. The output of 16 is a positive D.C. signal proportional to the angular error $\theta$, $\theta$ being either positive or negative. This positive D.C. signal is applied to a valve circuit 17 which is arranged to be non-conducting until the input reaches a predetermined value, when it changes to its conducting state and operates a relay which stops the machine.

It will be appreciated that as the voltages applied to the transformer 3, and hence $\Delta x$ and $\Delta y$ vary in discrete steps as the brushes $B_1$ to $B_4$ change contacts, the D.C. signal applied to the valve circuit 14 will also vary in discrete steps, i.e., it will rise sharply when $\Delta x$ and $\Delta y$ change value, and will then be reduced gradually as the servo shaft is repositioned. This is more clearly shown with reference to FIGURE 2 which shows a profile which is being cut. Point $P_3$ (referred to as a major point) represents the end point of one parabolic span, e.g., the point whose x co-ordinate value is $X_3$ (FIGURE 1), the points whose x co-ordinates are $X_2$ and $X_1$ being to the left of the point $P_3$ in the drawing and the points whose x co-ordinates are $X_4$ and $X_5$ being to the right. The intermediate closely spaced points $p_2$, $p_3$ . . . referred to as sub-span points, are those whose co-ordinate values are derived from the parabolic interpolators A, B, etc., and applied to the studs $a_2$, $a_3$ . . . . As described with reference to FIGURE 1, the linear sub-interpolators produce a series of short sub-spans consisting of straight lines connecting adjacent sub-span points. The voltages $\Delta x$ and $\Delta y$ which are applied to the stators of resolver 7 (FIGURE 1) represent the changes in co-ordinate values between two alternate points, e.g., $p_2$ and $p_4$ and the angle to which the resolver shaft is driven will represent the direction of the normal to the line joining these points, e.g., the normal $N_3$. When the cutter begins the sub-span from $p_3$ to $p_4$, due to the "leap-frogging" technique of deriving voltages from the parabolic interpolators, the values $\Delta x$ and $\Delta y$ applied to the resolver already represent the change in co-ordinate values between $p_2$ and $p_4$, and the servo loop including the motor 10 will have had time to settle to the position to represent the direction of the correct normal $N_3$. Part way between $p_3$ and $p_4$, at the instant represented in FIGURE 1, the value of $\Delta x$ will change from that between $p_2$ and $p_4$ to that between $p_3$ and $p_5$, since brushes $B_1$ and $B_4$ will be at contacts $a_3$ and $a_4$ while brushes $B_2$ and $B_3$ will be moving on to $a_4$ and $a_5$. The output from the resolver rotor winding 9 in FIGURE 1 will then change to represent the difference between the direction of the normal $N_3$ as set up by the rotor shaft, and the normal $N_4$ to the line joining $p_3 p_5$, and will start to drive the servo motor to reduce the difference to zero. The new position of the resolver shaft will represent the direction of the normal $N_4$. The servo however requires a finite time to perform the repositioning, which will take place when the cutter is between $p_3$ and $p_4$, but the normal signal representing the difference between the two normals is set up ahead of the cutter. The change in directions of the normals between one end of a complete parabolic span and the other is usually no more than 90°, and assuming that each span is divided into 25 sub-spans, the change in the normal direction from one sub-span to the next will be less than 4°. If, however, one of the major points $(X_4, Y_4)$ has been wrongly programmed or misread from the program, an undesired corner may be produced at the changeover from one span to the next, e.g., at $P_3$. The point $P_1$ represents the first minor point on the second required span and the point $p_1'$ the first minor point on the span which would be produced by the incorrect programme.

While the cutter is proceeding from $P_5$ to $P_3$, the point at which the error would occur, the direction of the normal $N_6$ to the line joining $p_5$ and $p_1'$ is being set up by the resolver. If, as shown, a sharp corner occurs at $P_3$, there will be a relatively large difference between the direction of the normal $N_6$ and the preceding normal $N_5$. The error signal derived from the rotor winding 9 of the resolver will therefore be larger than usual, and if it exceeds the predetermined limit set by the reference voltage applied to the threshold circuit 17, it will operate the relay in valve circuit 17 to stop the machine. It will be appreciated that the sudden change in the direction of the normal is always detected before the cutter reaches the point at which an error would be effective since the difference between the normals $N_5$ and $N_6$ is established before $P_3$ is reached and ensures that the error signal persists long enough for detection. This ensures that the machine is stopped before any damage to the workpiece can occur, and the programme may then be corrected before re-starting the machine. In some cases, it will be desirable to deliberately programme corners, and in such cases a special code may be punched on the programme tape and used to override the relay in the safety circuit to prevent the machine being stopped before the corner.

I claim:

1. Automatic control mechanism for a machine tool comprising means for setting up a series of signals which represent the values of one co-ordinate at a series of spaced points on a desired locus, means for linearly interpolating between successive pairs of next adajcent signals of said series to derive a command signal which varies to represent the value of said co-ordinate at successive points on said locus which are closer together than said spaced points, means for deriving another signal which is responsive to the difference between successive pairs of said series of signals spaced by one of said next adjacent signals, said last mentioned means including means for changing the pairs of signals to which said other signal responds in timed relationship with the operation of said interpolating means so that one signal of the pair always represents the value of said co-ordinate at a point on said locus which is ahead of the point to which the command signal relates, and means for producing a monitoring signal responsive to the changes which occur in said other signal when the pair of signals to which it responds is changed, and means for producing an action signal when said monitoring signal exceeds a predetermined value.

2. Automatic control mechanism for a machine tool comprising first means for setting up a first series of signals which represent the values of one co-ordinate at a series of spaced points on a desired locus, second means for setting up a second series of signals which represent the values of a second co-ordinate at said series of points, interpolating means for similarly interpolating among successive groups of said first and second series of signals to derive two command signals which vary respectively to represent the values of said two co-ordinates of successive points on said locus which are closer together than said spaced points, means for deriving a signal representing the direction of the normal to said locus, said last mentioned means being responsive to two difference signals, one representing the difference between successive pairs of said first series of signals and the other representing the difference between corresponding pairs of said second series of signals and said last mentioned means including means for changing both pairs of signals to which said difference signals relate in timed relationship with the operation of said interpolating means so that one of each pair of signals always represents the value of the respective co-ordinate of a point on said locus which is ahead of the point to which the command signals relate, and means for producing a monitoring signal which is responsive to the changes which occur in said signal representing the direction of the normal to said locus when the respective pairs of signals are changed, and means for producing an action signal when said monitoring signal exceeds a predetermined value.

3. Mechanism according to claim 2 wherein said means for deriving said signal representing the direction of the normal to said locus comprises a servo-driven resolver responsive to said difference signals, and said monitoring signal is derived from the error signals of said resolver.

4. Mechanism according to claim 3 wherein said resolver is arranged to drive a further resolver for generating cutter radius compensating signals.

5. Automatic control mechanism for machine tools comprising means for producing a command signal which varies to represent a first co-ordinate, means for deriving another signal which varies to represent a second co-ordinate, said signals defining the path of a cutter relative to a workpiece, means for producing an indication of the direction of the normal to said path at a first point, means for combining said command and other signals, taking account of said indication, to produce a monitoring signal representing the difference between the directions of the normals at said first point and at a second point of said path spaced from said first point, one of said points being ahead of the point of application of the cutter, means for producing an action signal when said monitoring signal exceeds a predetermined limit, and means responsive to said indication to resolve a signal representing a dimension of said cutter acting in the direction of the normal at said first point into components acting in the directions of said co-ordinates whereby compensation in said command and other signals for said cutter dimension can be effected.

6. Automatic control mechanism for machine tools comprising means for deriving command signals representing values of a co-ordinate at successive points which determine the path of a cutter relative to a workpiece, a servo-motor, resolving means coupled to said servo-motor for combining said command signals to produce an error signal for said servo-motor, whereby said servo-motor sets up an indication of the direction of said path, means for deriving a monitoring signal representing the difference between said indication and a signal dependent on the direction of said path at a point spaced from that corresponding to said indication, and means for producing an action signal when said monitoring signal exceeds a predetermined limit.

7. Mechanism according to claim 6 comprising means for deriving said monitoring signal from the error signal for said servo motor.

References Cited by the Examiner

UNITED STATES PATENTS

| | | | |
|---|---|---|---|
| 2,792,545 | 5/1957 | Kamm | 318—162 X |
| 2,833,941 | 5/1958 | Rosenberg | 235—151 |
| 2,928,604 | 3/1960 | Dudman et al. | 235—197 |
| 2,998,560 | 8/1961 | Mottu | 318—162 X |
| 3,086,154 | 4/1963 | Lowther | 235—151 |

MALCOLM A. MORRISON, *Primary Examiner.*

C. L. WHITHAM, K. W. DOBYNS, *Assistant Examiners.*